United States Patent [19]

Macovski

[11] 3,918,024

[45] Nov. 4, 1975

[54] ULTRASONIC ARRAY FOR REFLECTION IMAGING

[76] Inventor: Albert Macovski, 4100 Mackay Drive, Palo Alto, Calif. 94306

[22] Filed: June 24, 1974

[21] Appl. No.: 482,262

[52] U.S. Cl. ............... 340/1 R; 73/67.8 S; 73/67.9; 340/5 MP

[51] Int. Cl.[2] ........................................... G01S 9/66

[58] Field of Search ......... 340/1 R, 3 R, 5 MP, 5 H; 73/67.5 H, 67.7, 67.8 R, 67.8 S, 67.9

[56] References Cited

UNITED STATES PATENTS

| | | | |
|---|---|---|---|
| 3,090,030 | 5/1963 | Schuck | 340/1 R |
| 3,262,307 | 7/1966 | Hart | 73/67.8 S |
| 3,341,807 | 9/1967 | Lobdell | 340/1 R |
| 3,685,051 | 8/1972 | Wells | 340/5 H |
| 3,836,948 | 9/1974 | Burckhardt et al. | 340/1 R |

*Primary Examiner*—Richard A. Farley

[57] ABSTRACT

A pulsed ultrasonic beam is focused by a circular transducer array. The circular transducer drive pattern is arranged to provide a well-resolved narrow beam in one dimension as the pulsed wavefront propagates through the object under study. Following the transmission of the pulse, the transducer array is rearranged to receive the reflected ultrasonic pulses from various regions in the object. The receiver transducer pattern provides good resolution in a dimension normal to that of the transmitted pattern so that the resultant total pattern is well-resolved in all dimensions. The receiver pattern can be varied with time to optimally receive reflections from different depths in the object.

15 Claims, 3 Drawing Figures

ULTRASONIC ARRAY FOR REFLECTION IMAGING

BACKGROUND OF THE INVENTION

1. Field of the Invention

This invention relates to ultrasonic imaging systems. In a primary application the invention relates to pulse echo systems where information is derived from the reflected sonic energy at different depths.

2. Description of Prior Art

Ultrasonic imaging techniques are widely used for nondestructive testing in industry and for imaging of soft tissue structures in medical diagnosis. Examples of commercially available instruments used in medical diagnosis include the Sonolayergraph made by Toshiba Ltd. and the Sonograf made by the Unirad Corporation. These instruments use a pulsed sound source and record the received echoes coming from different depths. In the A mode presentation these are displayed as a deflection signal indicating the amplitude of the reflections. This technique is primarily used for echoencephalograms to study midline shifts in the brain. The most common technique is the B mode where the received echoes intensity modulate the display as the transducer is moved along to form a cross sectional image. Other modes are used which are essentially combinations and variations of these A and B modes. One example of the clinical use of A and B scan instruments can be found in the British Journal of Radiology, Vol. 44, Nov. 1971. "The use of ultrasound in the diagnoses of renal disease," by R. A. Mountfort, et al.

The principal performance difficulties with the instruments stem from the use of a non-focused sonic beam. The propagating sonic beam is relatively broad, thus causing poor lateral resolution. if attempts are made to make the beam narrow, it will spread due to diffraction at an angle of approximately $\lambda/D$ where $\lambda$ is the wavelength of the sonic source and D is the diameter of the emerging beam. Existing beam widths are a compromise between the size of the initial beam and the diffraction spread. If a lens is used to focus the beam, it will be effective in only a narrow depth region, with the remainder of the beam being out of focus and exhibiting the poor lateral resolution.

One approach to the problem of obtaining good lateral resolution over many depth planes is to both transmit and receive with a circular transducer array. A circular array has the desirable property that it maintains its same relative lateral resolution at all depth planes. A system of this type was described by C. B. Burckhardt, P. A. Grandchamp, and H. Hoffman entitled, "Methods for Increasing the Lateral Resolution of B-Scan." It was presented at The Fifth International Symposium on Acoustical Holography and Imaging, July 18–20, 1973 in Palo Alto, Calif. and is in the proceedings published by Plenum Press. In the system described the circular array is first used to transmit and receive with all of the elements around the array tied together. The resultant pattern, although a considerable improvement over the commercially available transducers, has excessive sidelobes as compared to the response in the focal plane of a lens system. In the same paper, an improved system is described whereby a second pulse is generated with different phase applied to the various transducer elements of the circular array in both the transmit and receive modes. This second received pulse is primarily responsive to the sidelobe patterns only and ignores the central beam information. By subtracting these two signals, for each depth plane, a well-resolved beam is formed.

The system presented had a number of practical difficulties. Firstly, the time involved in exploring a particular region is doubled since two scans, rather than one, are required. In addition, considerable storage is required since the reflections from the first signal, at every depth plane, must be stored so as to perform subtraction with the second signal. Lastly, in the method described only the line along the axis of the circular array is studied. In order to generate a B scan the array must be manually or mechanically scanned along the surface of the body.

SUMMARY OF THE INVENTION

An object of this invention is to provide ultrasonic imaging apparatus which will result in well-resolved images of the reflected waves over the entire region being studied.

It is also an object of this invention to provide these images in real time without requiring any motion of the transducers.

Briefly, in accordance with the invention a circular transducer array is driven with a pattern which provides a transmitted beam having good resolution in one dimension. Following transmission, a receiver array pattern is used which provides good resolution in a direction normal to that provided by the transmitter array. The product of the transmitter and receiver patterns thus has good lateral resolution at all depth planes.

BRIEF DESCRIPTION OF THE DRAWINGS

For a more complete disclosure of the invention, reference may be made to the following detailed description of several illustrative embodiments thereof which is given in conjunction with the accompanying drawings, of which.

DESCRIPTION OF THE PREFERRED EMBODIMENT

Figure 1:
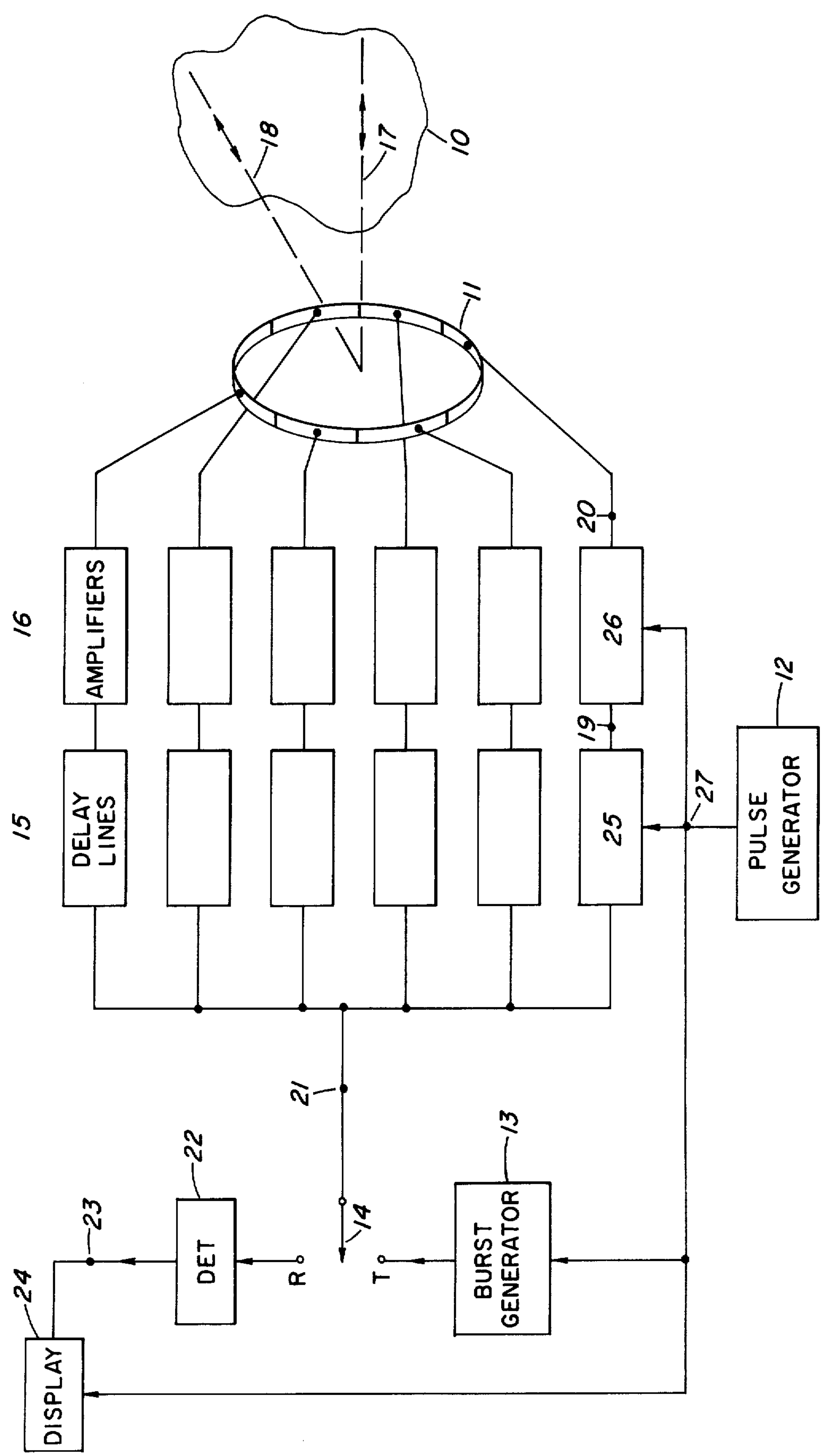
FIG. 1 is a block diagram illustrating an embodiment of the invention using a circular array for obtaining a sector scan.

An understanding of the broad aspects of the invention may best be had by reference to FIG. 1 of the drawings. An object 10, for example the human abdomen, is being studied by ultrasonic reflections. The circular array 11 is used as both transmitter and receiver to illuminate a line in object 10 and receive ultrasonic reflections from the various regions along the line. These reflections are received in sequence as the wave propagates through the object. It is desired that the resultant received reflections will be well-resolved in all dimensions. The effective resolution pattern of the received signals is the product of the individual transmitter and receiver patterns.

The resultant field pattern of a circular array is simply the Fourier transform of the array function multiplied by a quadratic phase factor which does not contribute to the amplitude of the resultant pattern and will thus be ignored. The important desirable property of a circular array is that the same relative pattern persists along the axis of the circle at all distances, unlike a lens which achieves its optimum resolution at a single plane in space. One method, described by C. B. Burckhardt et al. in the proceedings of The Fifth International Symposium on Acoustical Holography and Imaging, has all of the elements of the circular array 11 tied together and thus at the same amplitude and phase. The Fourier transform of a circle of uniform phase is $$J_0\left(\frac{krR}{z}\right)$$

where $J_0$ is the Bessel function of the zero$^{th}$ order and the first kind, $k$ is the wavenumber of $2\pi/\lambda$ where $\lambda$ is the wavelength, $R$ is the radius of the circle, $z$ is the distance to the plane being observed, and $r$ is the radial distance from the center of the transmitted beam 17. The resultant pattern, as is given in the Handbook of Mathematical Functions, by M. Albramowitz and L. A. Stegun published by the National Bureau of Standards, is considerably poorer than that obtained by a lens in that the sidelobes, or response off the axis, is considerably greater than that obtained in the focal plane of a lens. As a result reflections from interfaces off the axis of the beam 17 will be received, resulting in relatively poor resolution. In the Burckhardt paper, in one version, this same pattern is used by the same circular array to receive the reflections providing an overall pattern of $$J_0^2\left(\frac{krR}{z}\right).$$

Although this squaring operation reduces the undesirable sidelobes, they are still considerably greater than that of a focused lens system. In further parts of the Burckhardt paper improved systems are presented which involve synthesizing a desired response using a number of transmit-receive patterns. This not only requires additional time to explore each region of the object, but requires considerable storage to store the patterns for each reflection along the length of the beam. This invention provides the desired resolution patterns in a single transmit-receive operation without requiring storage.

Referring to FIG. 1 a pulse generator 12 is used to initiate each scanning line through object 10. The transmit-receive switch 14 is initially in the transmit or T position. Pulse 27 from pulse generator 12 generates a sinusoidal burst drive signal from burst generator 13. Thus signal 21 is a sinusoidal burst which is first applied to an array of controlled delay lines 15 and then to an array of controlled amplifiers 16. The controlled delay lines 15 serve the function of deflecting the beam and will be discussed subsequently. For the present discussion they can be ignored and the burst drive signals at 21 can be assumed to be applied to the array of controlled amplifiers 16. These can simply be resistive attenuators or any type of weights which will apply the desired amplitude function to the various transducer elements in the circular array 11. In the transmit mode, a pattern is generated which has good resolution, thus relatively free of side lobes, in one dimension. This is accomplished by weighting the transmitted signals, using controlled amplifiers 16, in a pattern which is symmetric in the y axis. For example, using the convolution characterization where the positive $x$ axis represents the 0° line, the desired pattern will reach its maximum at the 0° and 180° regions of the circle. As will be shown, this will provide a well-resolved transmitted beam along the $y$ axis with remaining side lobes along the $x$ axis. For example, assume the various controlled amplifiers 16 are weighted according to the function $\cos^2\theta$ which has its maximum at 0° and 180°, and has a value of zero at 90° and 270°. The resultant Fourier transform of this pattern $f(r,\theta)$ is given by $$f(r,\theta) = \frac{1}{2}\left[J_0\left(\frac{krR}{z}\right) - J_2\left(\frac{KrR}{z}\right)\cos 2\theta\right].$$

This makes use of the Fourier transform identity of a circle weighted by a cosine function as given by $$F\{\delta(r-R)\cos n\theta\} = j^n J_n \cos n\theta$$

where $F$ is the Fourier transform operator and $J_n$ is the Bessel function of the $n^{th}$ order. Using the Bessel function identity $$\frac{nJ_n(x)}{x} = J_{n-1}(x) + J_{n+1}(x)$$

this pattern can be rewritten as $$f(r,\theta) = \frac{J_1\left(\frac{krR}{z}\right)}{\left(\frac{krR}{z}\right)} - J_2\left(\frac{krR}{z}\right)\cos^2\theta$$

The first term of this pattern expression is that of the focal plane of a circular lens of radius $R$. Thus, in the $y$ direction where $\cos^2\theta = 0$, this pattern has the properties of a focused lens at all distances $z$. The added term represents a side lobe pattern which reaches its maximum in the $x$ direction. Since $J_2(0) = 0$, this second term does not alter the pattern on the axis of the beam but merely adds side lobes weighted by $\cos^2\theta$.

The system resolution is determined by the product of the transmit and receive patterns. Following the transmission of the transmitted burst the transmit-receive switch 14 is placed in the receive position R. The pulse generator 12 also can be used to change the state of the controlled delay line 15, as will be subsequently discussed, and the controlled amplifiers 16. For example the back edge of the pulse appearing at 27, which indicates the end of the transmitted burst, can be used to change various functions from the transmit state to the receive state. The controlled amplifiers 16 must be changed to provide the desired receiver pattern. Each of the controlled amplifiers 16, which can be resistive attenuators, are switched so as to provide the desired gain, as a function of $\theta$, in the receive direction. For example, controlled amplifier 26 is switched by the trailing edge of pulse 27 to provide the desired gain function to the signal received at its transducer element. The gain functions are, in general, the same as that of the transmitter gain functions rotated by 90°. Thus the receiver weighting provides a maximum gain in the $y$ direction, or the 90° and 270° regions of the circle. One example of such a receiver weighting is $\sin^2\theta$. This provides a receiver sensitivity pattern $g(r, \theta)$ given by $$g(r,\theta) = \frac{1}{2}\left[J_0\left(\frac{krR}{z}\right) + J_2\left(\frac{krR}{z}\right)\cos 2\theta\right] = \frac{J_1\left(\frac{krR}{z}\right)}{\left(\frac{krR}{z}\right)} - J_2 \sin^2\theta$$

This pattern has the resolution properties of a focused lens in the $x$ direction where $\sin^2\theta = 0$. The remaining side lobe pattern reaches its maximum in the $y$ direction. Thus the product of the two patterns will be relatively free of side lobes in both the $x$ and $y$ directions. The worst side lobe condition will be at the diagonal directions where the transmit and receive side lobe patterns experience their maximum overlap.

A variety of other similarly weighted transmitter and receiver patterns can be used to achieve the desired result whereby each pattern provides the desired lateral resolution in one dimension. Another example is to have the transmitter drive signals be both amplitude and phase weighted with $e^{j\theta}$ $\cos\theta$, and the received signals weighted by $e^{j\theta}$ $\sin\theta$ giving patterns $$f(r,\theta) = \frac{J_1\left(\frac{krR}{z}\right)}{\left(\frac{krR}{z}\right)} - J_2\left(\frac{krR}{z}\right) e^{j} \cos\theta$$

and $$g(r,\theta) = j\,\frac{J_1\left(\frac{krR}{z}\right)}{\left(\frac{krR}{z}\right)} - J_2\left(\frac{krR}{z}\right) e^{j} \sin\theta$$

These as before, each have the focused patterns in the one direction with the maximum side lobe pattern in the other direction. This combination, as before will have its poorest overall transmit-receive pattern along the two diagonals. In each of these transmitter and receiver weightings the controlled amplifiers 16 were required to both vary attenuation and phase shift as a function of $\theta$.

As a final example of the many similar patterns which can be used we examine a transmitter weighting function of $\cos^4\theta$ and a corresponding receiver weighting of $\sin^4\theta$ resulting in transmitter and receiver patterns $f(r,\theta)$ and $g(r,\theta)$ as given by $$f(r,\theta) = \frac{3}{8} J_0\left(\frac{krR}{z}\right) - \frac{1}{2} J_2\left(\frac{krR}{z}\right)\cos\theta + \frac{1}{8} J_4\left(\frac{krR}{z}\right)\cos 4\theta\,,$$

$$g(r,\theta) = \frac{3}{8} J_0\left(\frac{krR}{z}\right) + \frac{1}{2} J_2\left(\frac{krR}{z}\right)\cos 2\theta + \frac{1}{8} J_4\left(\frac{krR}{z}\right)\cos 4\theta\,.$$

These have the same general side lobe characteristics as the previously described patterns. The choice of the desired transmitter and receiver weightings and their resultant patterns is a compromise between optimum lateral resolution and the worst side lobe condition. The weightings can be made various combinations of those listed here or others such as cosine and sine functions raised to higher powers. The transmitter and receiver weightings need not be of the same form.

Using the chosen receiver weightings in controlled amplifier 16 the received signals, such as 20 from an element in array 11, is weighted by controlled amplifier 26 to form weighted signal 19. This signal is delayed by delay line 25, as will be described, and added to the other signals to form signal 21. With switch 14 in the $R$ or receive position, signal 21 is detected by envelope detector 22 to form detected signal 23 which is applied to display 24. The display is scanned in response to the pulse 27 from pulse generator 12 to provide a display representing the reflections received along line 17.

The system as described can provide some of the standard presentations presently used in ultrasound. For example, if signal 23 is used to deflect the line in display 24, the standard A scan format will be provided having a lateral resolution significantly better than is presently available. Alternatively signal 23 can be used to intensity modulate the display to provide a B scan. In this case the array 11 would be physically moved along the surface of object 10 to provide a sequence of scan lines. The scan lines of display 24 would be similarly translated to provide the conventional B scan raster showing a cross-section of object 10 at significantly improved lateral resolution. Thus the entire system can be used in a similar fashion to existing, single transducers, A and B scan systems.

Rather than use the awkward, slow system of moving array 11 to create a B scan, the array itself can be used to provide electronic scanning by deflecting the beam. Controlled delay lines 15, in both the transmit and receive modes, provide a delay to each element of the transducer which is linearly proportional to distance. In the case shown in FIG. 1 the delays would be directly proportional to the $y$ value. Thus each of the delay lines 15 has a value of $Ky$ where $K$ is a proportionality constant and $y$ is the particular $y$ value of the transducer element to which the delay line is connected. From a mathematical viewpoint, multiplication of the array function by $e^{jKy}$, where the delays are represented as phase shifts, is equivalent to translating the Fourier transform or the field patterns. Thus the array of linearly varying delay lines 15 cause the on-axis beam 17 to be deflected and form beam 18. This delay function can be used to generate a sector-scan B scan system. The delay lines 15 can be incremented in delay by changing the proportionality factor $K$ for each line. The leading edge of pulse 27 can be used to increment this $K$ value at the onset of each new scan line 18. Thus the delays, equal to $Ky$, will be incremented beginning each line to provide the desired sweep of the beam over the area of interest. The same delays function for both the transmit and receive mode. Following a complete scan involving a plurality of scan lines, the delay elements are initialized to their starting values.

The switchable delay lines 15 can be tapped delay lines with electronic switches selecting the desired delay. Alternatively they can be electronically variable delay lines such as CCD's (charge-coupled devices). These are semiconductor structures which move pockets of charge along at a rate determined by the clocking frequency. They are described in a paper entitled, "Charge-Coupled Semiconductor Devices," by W. S. Boyle and G. E. Smith in the Bell System Technical Journal, vol. 49, pp. 587—593, April 1970. Thus, by changing the clocking frequency of the CCD structures the desired delays 15 can be achieved for each desired scanning angle.

As was previously mentioned, when the circular array is used in both the transmit and receive mode, some side lobes remain along the diagonals since both patterns have residual side-lobe response in these directions. It would be desirable to provide a response with a minimum of side lobes in all dimensions. This can be accomplished using the receiver array shown in FIG. 2. As previously discussed, the transmitter pattern created by the circular array using the appropriate weightings of the drive amplitudes provides a pattern with the resolution of a focused lens in the $y$ direction, with undesired side lobes which maximize in the $x$ direction. The desired resolution can be achieved by using the equivalent of a cylindrical lens.

A linear array of transducers, as shown in array 30, when used with appropriate time delays or phase shifts functions as a cylindrical lens. The time delays used must match the time delays of the reflections from some point in object 10 separated from the array by a distance $z$. The time delay from any reflecting point to a point in the array is given by $r/c$ where $r$ is the range and $c$ is the velocity of sound. Assuming the reflecting point is on the axis the time delay $T$ is given by $$T = r/c = \frac{1}{c}\sqrt{x^2 + z^2} = \frac{z}{c}\sqrt{1 + \frac{x^2}{z^2}}.$$

Figure 2:
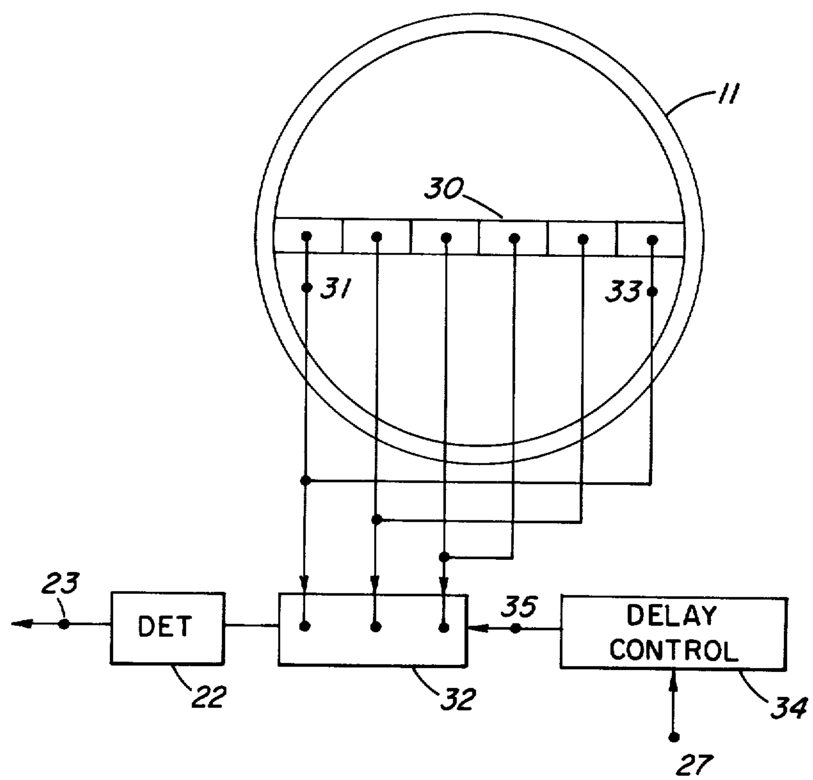
FIG. 2 illustrates an embodiment using a line array as the receiver array.

This can be approximated by $$T \cong \frac{z}{c} + \frac{x^2}{2zc}$$

for the case where $z >> x$. Thus the required time delay difference between each point along the linear array and the center of the array is given $-x^2/2zc$. The variation of time delay with the $x$ position is thus a negative quadratic function. When the appropriate delays are applied to each transducer element and summed, the linear array will form the equivalent of a cylindrical lens focused at distance $z$. This is accomplished using tapped delay line 32. Since the delay requirements are the same for the same positive and negative values of $x$, these can be tied together as shown in FIG. 2. For example, elements 31 and 33, are tied together and connected to tapped delay line 32. The delay difference between the center of the array 30 and each pair of elements is $x^2/2zc$. Thus a reflection from a point on the axis, a distance $z$ from the array, will result in a wave reaching the array at different times. These time differences are compensated for in delay line 32 to provide the equivalent of focusing with a cylindrical lens. The output of the tapped delay line 32 is detected by detector 22 and applied to display 24.

The basic difficulty with a linear array used as a cylindrical lens is that it is focused at a specific distance. It is thus unsuitable for the transmitter function since it provides good resolution only at the focal plane. In the receiver function, however, the focal plane can be dynamically varied as the pulse propagates through the object. Thus delay line 32 can be made dynamically time-varying so that array 30 will be focused at distance $z$ at the time that reflections are received from that distance. To accomplish this delay line 32 is varied in time from $x_{max}^2/2z_{min}c$ to $x_{max}^2/2z_{max}c$ as the sound pulse propagates from the minimum to the maximum depth of interest. Here $z_{min}$ and $z_{max}$ represent the depth ranges while $x_{max}$ is the maximum dimension of the array 30. The intermediate elements, which are connected to taps on the variable delay line 32, are varied proportionately. The delay line is controlled by delay controller 34. This control is initiated by pulse 27 which represents the initial propagation time of the transmitted wave. As before, it is convenient to make delay line 32 a CCD. In that case the delay control 34 will be a variable clock rate generator which will provide a clock rate proportional to the focal distance $z$. The variation will take place at the rate of sound propagation.

With receiver array 32 dynamically focused to the reflecting region in object 10, the receiver field pattern will again be the Fourier transform of the receiver aperture. This is well-explained in Chapters 5 and 6 in the book, *Introduction to Fourier Optics* by J. w. Goodman, McGraw-Hill, 1968. The thin array of transducers has a response $g(x)$ in the $x$ direction given by $$g(x) = \frac{\text{sine}\ \frac{kRx}{z}}{\frac{kRx}{z}}$$

This is the response of a focused cylindrical lens. In the $y$ direction, the line of focus will be very long, the exact length depending on the width of the elements in array 30. Thus the product of the receiver response $g(x)$, and any of the transmitter responses $f(r, \theta)$ previously discussed, will be that of a focused lens in all dimensions. The sharp response of $g(x)$ will undo the side lobes on any of the transmitter responses previously discussed.

Thus the combination of an appropriately weighted circular array as a transmitter and a dynamically focused line array as a receiver provides the desired resolution along the entire beam 17. To deflect the beam and create a B scan, the transmitter system is treated as before where delay lines 15 are made linearly proportional to the $y$ dimension. The receiver system need not be deflected since the receiver pattern is a long line in the $y$ dimension. Thus the transmitter is deflected to form beam 18 while receiver array 30 is sensitive to all reflections along the $x = 0$ line and provides the desired resolution in the $x$ dimension. Thus the system of FIG. 1 is used in the transmit mode only with the system of FIG. 2 used as the receiver.

Figure 3:
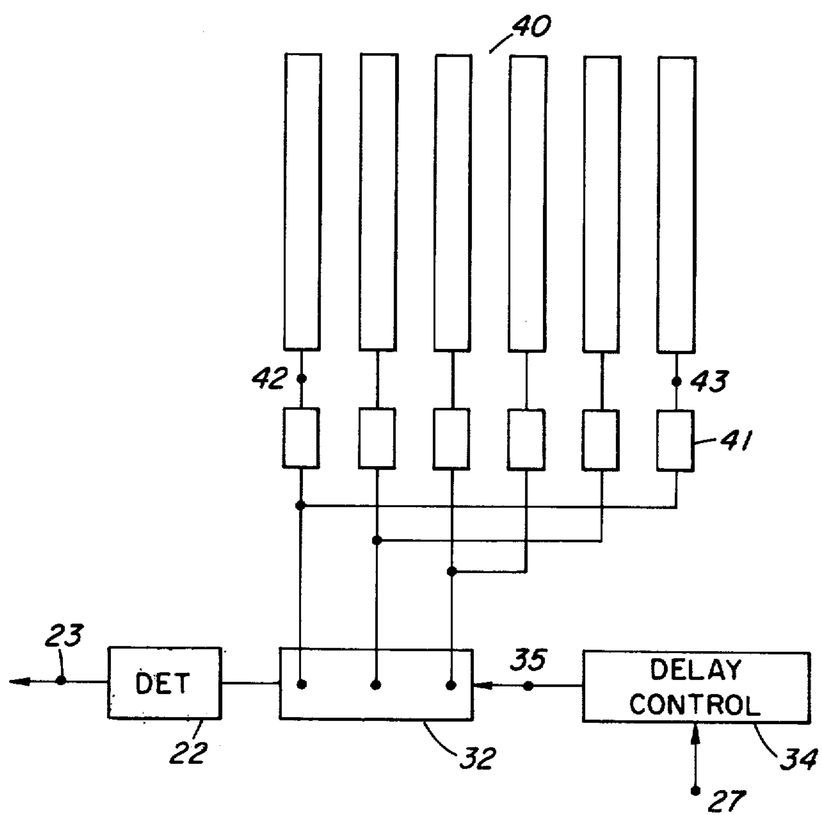
FIG. 3 illustrates an embodiment using a line of rectangular transducers as the receiver array.

Although the systems of FIGS. 1 and 2 provide the desired resolution and deflection, they are not maximized in sensitivity. Only a portion of the full size of the array is used to receive the reflections from the object. High sensitivity is desirable so as to minimize the requirement for sonic energy within the body. FIG. 3 illustrates a method for providing full array receiver sensitivity. Instead of a single row of elements as the line array, array 40 is used which is a row of rectangular elements which substantially fill the entire array size. These can either be rectangular in shape or can each be a number of elements in a two-dimensional array which are connected together along vertical lines. Ignoring controlled delay lines 41, if these elements are driven by the same quadratically tapped delay line 32 as used in FIG. 2, the resultant pattern will be the same in the $x$ direction. In the $y$ direction, however, the pattern will no longer be a very long line. At $z$ distances less that $L^2/\lambda$, where $L$ is the height of the array 40, the pattern in the $y$ direction will essentially be a line of length $L$. This is known as the near field region. For $z$ distances greater than $L^2/\lambda$, the line pattern will diverge and become longer. If this distance $L$ is large enough for the region in object 10 being studied, controlled delay lines 41 needn't be used and the system will be identical to that of FIG. 2. If, however, a larger region is being scanned, as is usually the case, a different system of deflection must be used.

In the transmitter of FIG. 1 delay lines 15 are used to deflect the beam in the $x$ direction rather than the $y$ direction. Thus the delay of each delay line is a controlled constant multiplied by the $x$ value of the element. The transmitted beam is then deflected in the horizontal plane and the resultant sector B scan is in this plane. The receiver pattern must be deflected the same amount to receive the reflections excited by the transmitted beam. Thus controlled delay lines 41 are used to provide the same delays of $Kx$ so that the receiver pattern will be along the same line as the transmitted beam. Since both patterns are being deflected in the $x$ direction, the length of the receiver pattern in the $y$ direction no longer matters. Thus the added complexity of deflecting delay lines in the receiver allow the use of an array which provides increased sensitivity. The delay line system 41 is controlled in the same manner as those of 15 previously described. This system provides the same $g(x)$ pattern as that of line array 30 so that the overall resolution is unchanged.

Although specific dimensions have been used throughout as examples it is obvious that any desired plane in the object can be explored by merely rotating the entire array. In the case of FIG. 1, using a circular array for both transmitting and receiving, the plane of interest can be rotated by electrically switching the connections to array 11 along the circle.

What is claimed is:

1. Apparatus for obtaining ultrasonic images of reflected waves from an object comprising:

a circular array of transducer elements positioned adjacent to the object forming a transmitter array;

means for driving each of the transmitter transducer elements with a plurality of drive signals whose amplitudes are weighted such that they are at a maximum at the 0° and 180° regions of the circle array whereby a transmitted beam is generated which is well-resolved in the 90°–270° plane;

a receiver transducer array positioned in substantially the same plane as that of the circular array providing a plurality of received signals from the receiver array elements;

means for summing the plurality of received signals from the receiver transducer array to form a processed signal representing a pattern which is well-resolved in the 0°–180° plane; and means for displaying the processed signal.

2. Apparatus as recited in claim 1 where the receiver transducer array is the same circular array of elements used as the transmitter array.

3. Apparatus as recited in claim 2 where the means for summing the plurality of received signals from the receiver transducer array includes a means for weighting the received signal amplitudes such that the maximum amplification occurs for those elements at the 90° and 270° regions of the circular array.

4. Apparatus as recited in claim 3 where the means for weighting the received signal amplitudes has an amplification varying with angle equal to one or more sinusoidal functions each raised to an integer power.

5. Apparatus as recited in claim 1 where the amplitudes of the drive signals have a variation with angle equal to one or more cosinusoidal functions each raised to an integer power.

6. Apparatus as recited in claim 1 including means for varying the time delay of the drive signals to each of the transducer elements of the transmitter array.

7. Apparatus as recited in claim 6 where the difference in time delay for each drive signal is proportional to the distance of the driven element from a diameter of the circular array whereby the transmitted beam is deflected about an axis which is the diameter of the circle.

8. Apparatus as recited in claim 7 including means for switching the time delay values between successive drive signal pulses whereby a plurality of lines in a plane of the object are scanned.

9. Apparatus as recited in claim 1 including means for varying the time delay of each of the plurality of received signals.

10. Apparatus as recited in claim 9 where the difference in time delay of each of the plurality of received signals is proportional to the distance of the receiver transducer element from a diameter of the circular array.

11. Apparatus as recited in claim 10 including means for switching the time delay values after receiving the most distant reflected signal from the object.

12. Apparatus as recited in claim 1 where the receiver transducer array is a line array of transducers substantially parallel to the 0°–180° line in the circular array.

13. Apparatus as recited in claim 12 including time-varying delay line means to delay the received signals from each element such that, at each time, the difference in delay of each element and the center element is substantially proportional to the square of the distance from the element to the center.

14. Apparatus as recited in claim 12 where each transducer in the line array is a rectangular transducer having its long dimension perpendicular to the 0°–180° line in the circular array.

15. Apparatus as recited in claim 14 where each rectangular transducer is a linear array of transducer elements which are connected together.

* * * * *